W. H. NOELTING.
TOP BEARING CASTER SOCKET.
APPLICATION FILED SEPT. 9, 1921.
1,426,494.  Patented Aug. 22, 1922.
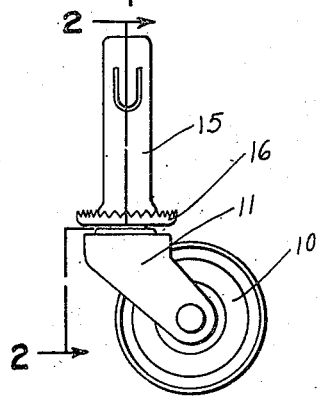
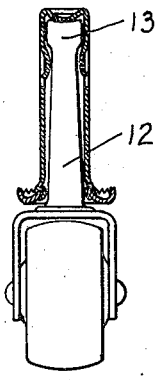
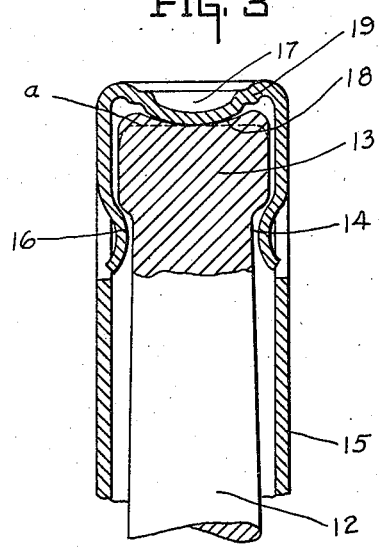
Inventor
WILLIAM H. NOELTING.

UNITED STATES PATENT OFFICE.

WILLIAM H. NOELTING, OF EVANSVILLE, INDIANA, ASSIGNOR TO FAULTLESS CASTER COMPANY, OF EVANSVILLE, INDIANA, A CORPORATION.

TOP-BEARING-CASTER SOCKET.

1,426,494.  Specification of Letters Patent.  Patented Aug. 22, 1922.

Application filed September 9, 1921. Serial No. 499,428.

*To all whom it may concern:*

Be it known that I, WILLIAM H. NOELTING, a citizen of the United States, and a resident of Evansville, county of Vanderburg, and State of Indiana, have invented a certain new and useful Top-Bearing-Caster Socket; and I do hereby declare that the following is a full, clear, and exact description thereof, reference being had to the accompanying drawings, in which like numerals refer to like parts.

This invention relates to caster sockets, and particularly to those of the type illustrated in Patent No. 454,257, dated June 16, 1891.

The chief object of this invention is to provide a socket of the type described with certain improvements in the head thereof, which will transmit the weight associated with the socket stem to the walls of the socket through the head thereof, by the particular conformation of the head.

The chief feature of the invention, therefore, consists in providing a tubular socket with an integral head portion which is extended inwardly into the socket to form a spherical bearing in the head thereof, and this spherical bearing is reinforced with an annular ring portion integral with the head and the bearing.

Another feature of the invention consists in associating with the improved socket head suitable centering and retaining means, whereby the caster stem will be centered within the socket and retained therein by said means contacting the same.

The full nature of the invention will be understood from the accompanying drawings and the following description and claims.

In the drawings, Fig. 1 is a side elevational view of the caster socket showing a caster associated therewith. Fig. 2 is a central sectional view of the socket showing the caster associated therewith, said view being taken along the line 2—2 of Fig. 1 and in the direction of the arrows. Fig. 3 is an enlarged central sectional view of the socket and the head of a caster stem, the latter having a part broken away to show a detail of the connection therebetween.

In the drawings 10 indicates the usual caster wheel rotatably supported by a yoke 11, which yoke in turn is supported by a pintle or stem 12, having a head portion 13. Herein the head portion is of greater diameter than the stem portion of the neck 14 thereof, which is reduced adjacent the upper end for a purpose hereinafter to be described. Associated with the caster stem is a tubular socket, indicated generally by the numeral 15 in Fig. 1. This socket is provided with suitable retaining means 16, whereby the same is secured to a leg. Other suitable retaining means than that illustrated may be associated with said socket, since the invention is not related thereto. As illustrated in the before-mentioned patent, the socket is preferably formed from a strip of metal formed into tubular shape and provided with inwardly extending tongue portions struck from the body portion of the tubular socket. The head of the socket also is integral with the body portion thereof. In the present invention the inwardly extending tongues 16, which are adapted to engage the neck portion 14 of the stem 12 when the load is removed from the caster so as to center the caster and retain the same within the socket, are integral with the body portion of the socket and extend downwardly and inwardly for such engagement.

The head portion of the tubular socket is substantially spherical in shape and extends inwardly, as indicated by the numeral 17 in Fig. 3. The head portion 13 of the caster stem is complementarily formed so as to form a spherical depression 18 into which the spherical projection 17 extends when the weight is applied to the caster. This spherical projection 17 substantially occupies the entire end of the tubular socket, thereby distributing the weight when applied to said projection directly to the walls of said socket, which prevents the movement of the socket stem 12 through the head portion of the socket 15, which heretofore has been the case with the structure shown in the prior patent mentioned. In order to further reinforce the spherical bearing surface 17, the same is provided with a concentric annular ring portion 19, which is positioned adjacent the connecting portion between the spherical surface and the end of the tubular socket. This reinforcing rib or ring is another protection against the forcing of the stem through the head of the socket.

The diameter of the spherical head 17 is at least equal to, and preferably is greater than the diameter of the tubular socket 12, such that the spherical surface constitutes a very flat oval bearing surface for uniformly receiving the load from the head of the caster and stem, and for uniformly distributing the load to the caster socket body portion. It will be noted from Fig. 3 that the head of the caster stem and the head of the caster socket are in contact for substantially half the area of the socket, and this contact is the method whereby the load is transmitted, as described, without the binding thereof, which has been the chief objection to the use of the caster socket and the head, shown in the prior patent referred to heretofore.

As shown by the dotted line $a$ in Fig. 3, the stem may, if desired, be flattened, but in any event the best results are obtained when the caster stem radius of curvature exceeds the radius of curvature of the socket head, which in turn exceeds the radius of the caster socket.

The invention claimed is:

1. A caster, including a stem having a head portion provided with a spherical depression positioned centrally therein, and a caster socket for said stem provided with an integral inwardly extending spherical projection for receiving said stem and being seatable in said spherical depression, the radius of curvature of said socket spherical projection being greater than the radius of said tubular socket.

2. A caster, a socket for a caster stem and provided with an integral inwardly extending spherical head projection for receiving said stem, and a reinforcing ring integral with said socket and head projection and interposed therebetween for reinforcing the same.

3. A caster, a socket for a caster stem and provided with an integral inwardly extending spherical head projection for receiving said stem, a reinforcing ring integral with said socket and head projection and interposed therebetween for reinforcing the same, and inwardly extending tongue means at one end integral with the socket to engage the caster stem and retain the same within the socket and simultaneously center the same therein.

In witness whereof I have hereunto affixed my signature.

WILLIAM H. NOELTING.